(12) United States Patent
Mansour

(10) Patent No.: US 7,643,406 B2
(45) Date of Patent: Jan. 5, 2010

(54) SYSTEM AND METHOD FOR ENHANCING CAPACITY FOR A WIRELESS COMMUNICATION SYSTEM

(75) Inventor: Nagi A. Mansour, Arlington, VA (US)

(73) Assignee: Nextel Communications Company L.P., Reston, VA (US)

( * ) Notice: Subject to any disclaimer, the term of this patent is extended or adjusted under 35 U.S.C. 154(b) by 513 days.

(21) Appl. No.: 11/200,186

(22) Filed: Aug. 10, 2005

(65) Prior Publication Data

US 2006/0120274 A1    Jun. 8, 2006

Related U.S. Application Data

(60) Provisional application No. 60/632,941, filed on Dec. 6, 2004.

(51) Int. Cl.
*H04J 11/00* (2006.01)
(52) U.S. Cl. .................. 370/209; 370/329; 370/280; 370/321
(58) Field of Classification Search .......... 370/342, 370/318, 334–335, 252, 337, 235, 329, 203, 370/209, 519, 441, 341, 332, 280, 321; 375/150, 375/136; 455/450, 447, 62, 63, 452.1, 522, 455/69, 517
See application file for complete search history.

(56) References Cited

U.S. PATENT DOCUMENTS

| | | | | |
|---|---|---|---|---|
| 6,504,827 | B1 * | 1/2003 | Kuo et al. ................. | 370/329 |
| 6,711,144 | B1 * | 3/2004 | Kim et al. ................. | 370/335 |
| 6,819,935 | B2 * | 11/2004 | Kenney et al. ............ | 455/522 |
| 6,934,275 | B1 * | 8/2005 | Love et al. ................. | 370/342 |
| 2002/0089950 | A1 * | 7/2002 | Sourour et al. ............ | 370/335 |
| 2003/0081574 | A1 | 5/2003 | Moon et al. | |
| 2003/0103447 | A1 * | 6/2003 | Thorson et al. ............ | 370/209 |
| 2003/0114162 | A1 * | 6/2003 | Chheda et al. ............. | 455/447 |
| 2004/0066772 | A1 * | 4/2004 | Moon et al. ................ | 370/342 |
| 2004/0071125 | A1 * | 4/2004 | Gross et al. ................ | 370/347 |
| 2004/0071163 | A1 * | 4/2004 | Hogberg et al. ........... | 370/468 |
| 2004/0125772 | A9 * | 7/2004 | Wu et al. ................... | 370/335 |
| 2004/0192315 | A1 * | 9/2004 | Li et al. ..................... | 455/447 |
| 2004/0228353 | A1 * | 11/2004 | Balachandran et al. . | 370/395.21 |
| 2004/0264419 | A1 * | 12/2004 | Kim et al. .................. | 370/335 |
| 2005/0163238 | A1 * | 7/2005 | Fujii .......................... | 375/260 |
| 2005/0271005 | A1 * | 12/2005 | Rajkotia .................... | 370/329 |
| 2006/0203731 | A1 * | 9/2006 | Tiedemann et al. ........ | 370/235 |
| 2006/0262805 | A1 * | 11/2006 | Shanbhag .................. | 370/441 |
| 2007/0076583 | A1 * | 4/2007 | Hadad ....................... | 370/203 |

(Continued)

OTHER PUBLICATIONS

Notification of Transmittal of The International Search Report dated Feb. 21, 2006, including International Search Report and Written Opinion of The International Searching Authority, (Eight (8) pages).

*Primary Examiner*—Tan Trinh

(57) ABSTRACT

A system and method for sharing a forward link time slot are disclosed. Information being sent to each user sharing a time slot in a 1× evolution data only (1×EV-DO) frame is assigned a number of Walsh codes and allocated an amount of transmit power. The total amount of transmit power used by a base transceiver station for a time slot is divided among the users. The number of Walsh codes and amount of transmit power assigned to each user sharing a time slot can be based upon the RF conditions being experienced by the user.

20 Claims, 4 Drawing Sheets

U.S. PATENT DOCUMENTS

2007/0206542 A1* 9/2007 Proctor, Jr. .................. 370/335
2007/0263586 A1* 11/2007 You et al. ................... 370/342
2008/0056185 A1* 3/2008 Alapuranen et al. ......... 370/329
2008/0285670 A1* 11/2008 Walton et al. ............... 375/260

* cited by examiner

SYSTEM AND METHOD FOR ENHANCING CAPACITY FOR A WIRELESS COMMUNICATION SYSTEM

CROSS-REFERENCE TO RELATED APPLICATIONS

This application claims the benefit of U.S. Provisional Application No. 60/632,941, filed Dec. 6, 2004, the entire disclosure of this application is herein expressly incorporated by reference.

BACKGROUND OF THE INVENTION

FIG. 1 illustrates an exemplary 1× evolution data only (1×EV-DO) forward link frame. 1×EV-DO is a data only mobile telecommunications standard. The forward link frame of the 1×EV-DO standard is a downlink frame of data from a base station to a mobile station in a telecommunications system. As illustrated in FIG. 1, one frame has 16 time slots, and each time slot has a duration of 1.67 ms. In 1×EV-DO Revision 0, only one user is allowed in each time slot. FIG. 2 illustrates an exemplary time slot in accordance with 1×EV-DO Revision A. As illustrated in FIG. 2, Revision A can allow, for example, three users in one time slot. However, this only applies to broadcast information, and accordingly, all three users are lumped together in the time slot and are given the total power allowed for the time slot.

There are a number of disadvantages in the manner in which Revision A allows users to share the same time slot. For example, assuming that all three users are being sent information in one time slot of a forward link frame, the information is broadcast as a single packet of information to all three users. Accordingly, if less than all of the users received the information, the entire time slot is re-sent including the information for all three users. This results in a waste of system resources on the air-interface, where resources are particularly valuable. For example, for a data rate of 38.4 kb/s in 1×EV-DO, the system is required to send 16 time slots of data. If the receiver manages to extract the information for two users after 8 time slots; the system will still send information for those two users until the third user extracts his information. This results in an unnecessary waste of capacity, when pathloss is different for the various users, as it might be difficult to find three users with the same RF conditions.

SUMMARY OF THE INVENTION

Exemplary embodiments of the present invention are directed to systems and methods for providing information to multiple users in a single forward link time slot. Each user is allocated one or more Walsh codes for the shared time slot. Additionally, the total transmit power for the time slot can be divided among the different users, based upon each user's RF conditions.

Other objects, advantages, and novel features of the present invention will become apparent from the following detailed description of the invention when considered in conjunction with the accompanying drawings.

BRIEF DESCRIPTION OF THE DRAWING FIGURES

DETAILED DESCRIPTION OF THE EXEMPLARY EMBODIMENTS

In accordance with exemplary embodiments of the present invention, a time slot of a forward link frame is shared by multiple users by assigning one or more Walsh codes for each user, wherein a power allocation for each user depends upon the number of Walsh codes assigned. Walsh codes are a family of orthogonal codes widely used for mobile telecommunications transmissions, such as in a Code Division Multiple Access (CDMA) system. Walsh codes are one of a group of specialized pseudonoise (PN) codes that have good autocorrelation properties, while exhibiting low levels of cross-correlation. Walsh Codes are used to uniquely define individual communication channels. Since Walsh codes are orthogonal mathematical codes, if two Walsh codes are correlated, the result is intelligible only if the two codes are the same.

Figure 1:
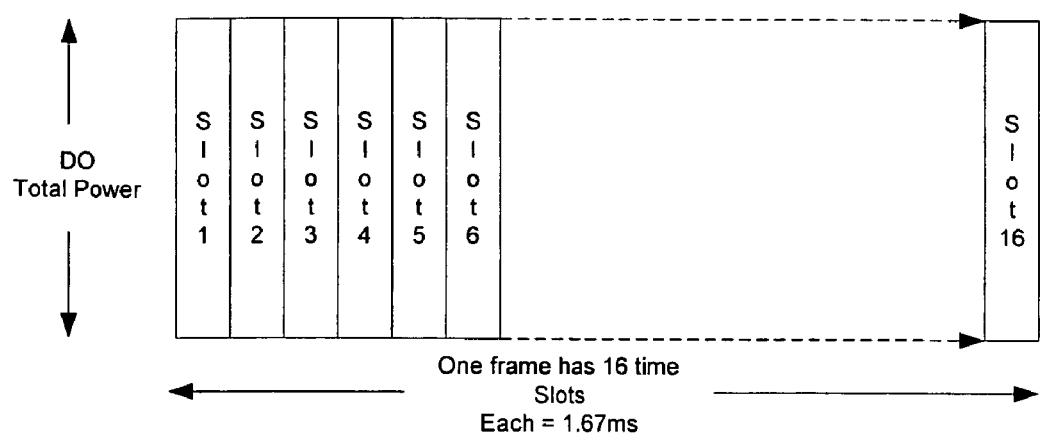
FIG. 1 illustrates an exemplary forward link frame.
Figures 2, 3:
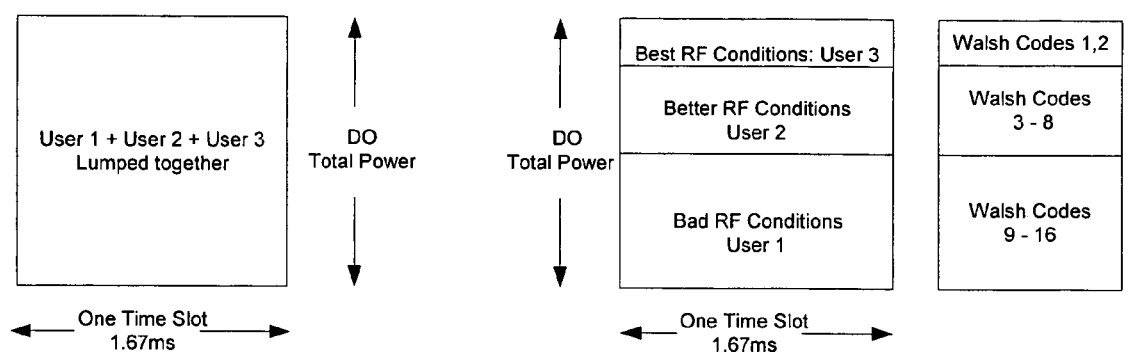
FIG. 2 illustrates an exemplary time slot being shared by three users in accordance with 1×EV-DO Revision A.
FIG. 3 illustrates an exemplary time slot being shared by three users in accordance with the present invention.

Referring now to FIG. 3, the Walsh codes are assigned to particular users based upon the radio frequency (RF) conditions of each of the users. As illustrated in FIG. 3, for example, information being sent to a user with the worst RF conditions, e.g., user 1, is assigned 8 Walsh codes, information being sent to a user with better RF conditions, e.g., user 2, is assigned 6 Walsh codes, and information being sent to a user with the best RF conditions, e.g., user 3, is assigned 2 Walsh codes. Assuming, for example, that the base transceiver station (BTS) allocates 16 Watts of power for each time slot, information being sent to user 1 can be provided with 8 Watts of power for the 8 Walsh codes, information being sent to user 2 can be provided with 6 Watts of power for the 6 Walsh codes, and information being sent to user 3 can be provided with 2 Watts of power for the 2 Walsh codes. Thus, the total number of Walsh codes allocated to each time slot is sixteen.

The number of Walsh codes and amount of power assigned to particular users described above is merely exemplary. The present invention can provide for various combinations of Walsh code and transmit power assignments. Additionally, although the present invention has been described in connection with three users sharing a time slot, the present invention is equally applicable to time slot sharing between other numbers of users.

Using the time slot sharing technique disclosed above provides a number of advantages over existing techniques. By providing different numbers of Walsh codes and different amounts of power for information being sent to each user of the shared time slot, the present invention is better able to accommodate users of varying RF conditions. If a packet for one of the users is lost, the BTS does not have to retransmit the data for all users of the shared time slot. Also, the present invention can implement early termination of data transmission, which refers to ending data transmission when the data has been received by the users to whom the data is sent, rather than continuing to transmit the data until an allocated number of time slots has been used. By using early termination of the data transmission, the present invention results in an appreciable increase in data transmission capacity. Moreover, the technique provided by the present invention is more suitable for supporting Voice over Internet Protocol (VoIP), compared to the time slot sharing technique of 1×EV-DO Rev A.

Figure 4:
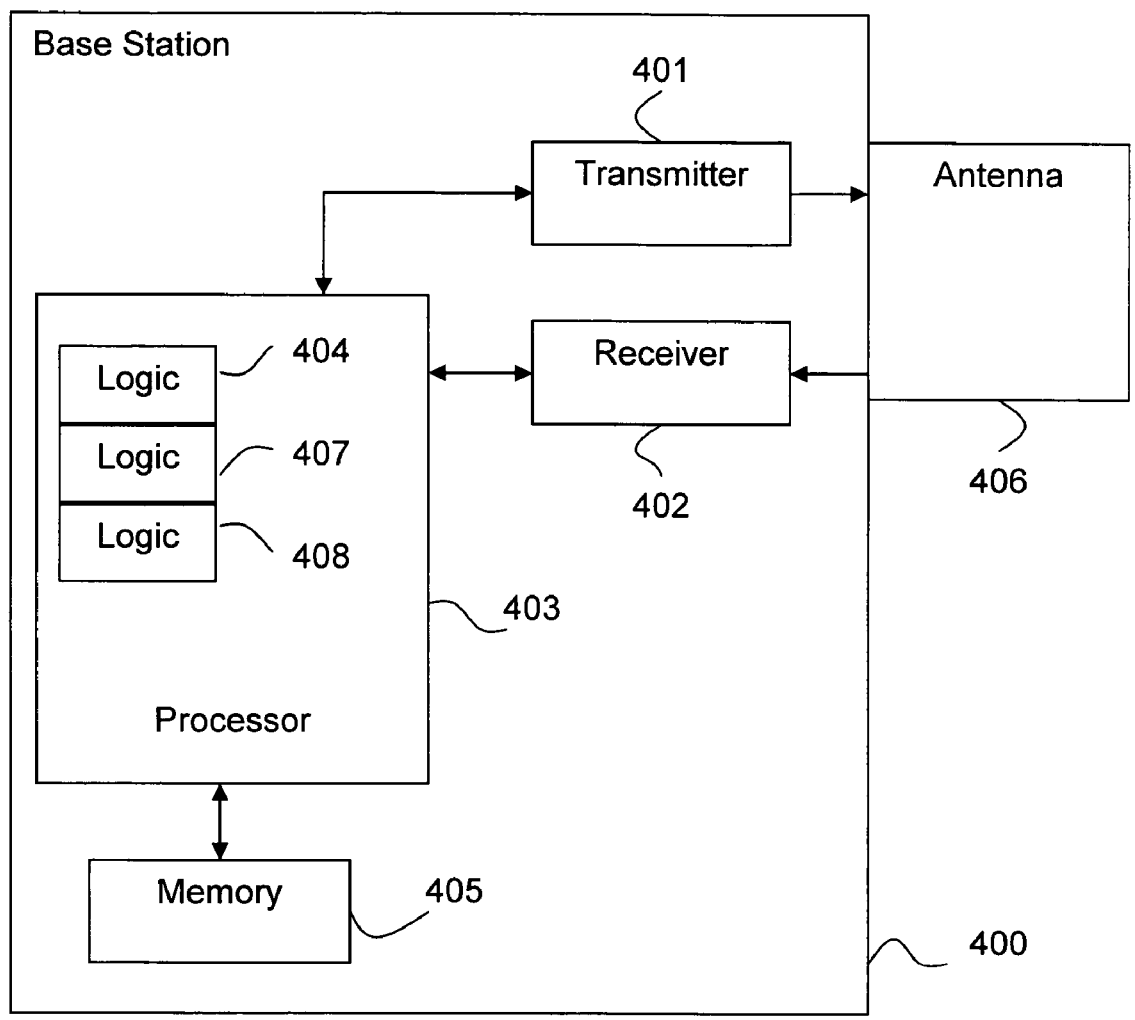
FIG. 4 illustrates an exemplary wireless communication device in accordance with the present invention.

FIG. 4 illustrates an exemplary embodiment of a wireless communication device according to the present invention. As illustrated in FIG. 4, the wireless communication device may be a base station 400, which includes a transmitter 401, a receiver 402, a processor 403, a memory 405, and an antenna 406. The processor 403 can be a microprocessor, field programmable gate array (FPGA), application specific integrated circuit (ASIC) and/or the like. Memory 405 is coupled to the processor 403 and can store information for the processor and/or include a program for operation of the processor. Memory 405 can be read-only memory, random access memory, flash memory, a hard drive and/or the like. The processor 403 includes logic 404, 407, and 408. In an exemplary embodiment of the present invention, the logic 404 determines radio frequency (RF) conditions for a number of users, the logic 407 assigns a number of Walsh codes to each of the number of users, based on the determined RF conditions, and the logic 408 transmits information to the number of users in a same time slot using the number of Walsh codes assigned to each user.

Figure 5:
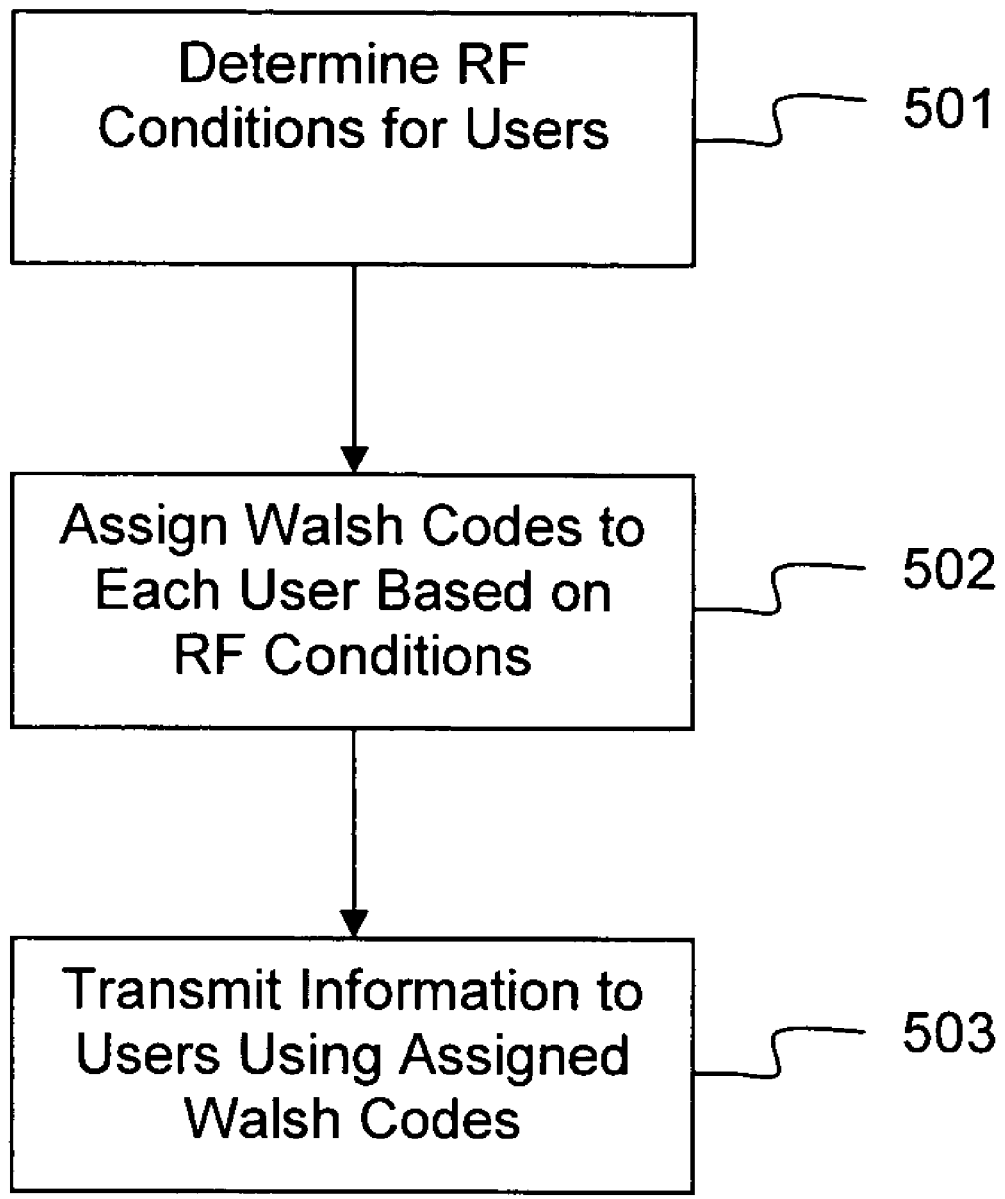
FIG. 5 illustrates an exemplary method in accordance with the present invention.

An exemplary method for transmitting information from a base transceiver station is illustrated in FIG. 5, wherein the method includes: determining radio frequency conditions for a number of users (step 501); assigning a number of Walsh codes to each of the number of users based on the determined radio frequency conditions (step 502); and transmitting information to the number of users in a same time slot using the number of Walsh codes assigned to each user (step 503). In an exemplary embodiment of the present invention, the same time slot is transmitted in a 1× evolution data only (1×EV-DO) frame.

In an exemplary embodiment of the present invention, an amount of transmit power is assigned to each user based on the determined radio frequency conditions. Users with worse radio frequency conditions may be assigned more transmit power than users with better radio frequency conditions.

According to another exemplary embodiment of the present invention, there is a computer-readable medium encoded with a computer program for transmitting information from a base transceiver station, the computer program including instructions for: determining radio frequency conditions for a number of users; assigning a number of Walsh codes to each of the number of users based on the determined radio frequency conditions; and transmitting information to the number of users in a same time slot using the number of Walsh codes assigned to each user. The instructions associated with the computer-readable medium are described above in relation to FIG. 5. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

While the invention has been described in connection with various embodiments, it will be understood that the invention is capable of further modifications. This application is intended to cover any variations, uses or adaptations of the invention following, in general, the principles of the invention, and including such departures from the present disclosure as known, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmitting information from a base transceiver station, the method comprising the acts of:
   determining radio frequency conditions for a number of users;
   assigning a number of Walsh codes to each of the number of users based on the determined radio frequency conditions; and
   transmitting information to the number of users in a same time slot using the number of Walsh codes assigned to each user.

2. The method of claim 1, wherein an amount of transmit power is assigned to each user based on the determined radio frequency conditions.

3. The method of claim 2, wherein users with worse radio frequency conditions are assigned more transmit power than users with better radio frequency conditions.

4. The method of claim 1, wherein the same time slot is transmitted in a 1× evolution data only (1×EV-DO) frame.

5. The method of claim 1, wherein users with worse radio frequency conditions are assigned more Walsh codes than users with better radio frequency conditions.

6. A base transceiver station comprising:
   logic which determines radio frequency conditions for a number of users;
   logic which assigns a number of Walsh codes to each of the number of users, based on the determined radio frequency conditions; and
   logic which transmits information to the number of users in a same time slot using the number of Walsh codes assigned to each user.

7. The base transceiver station of claim 6, wherein an amount of transmit power is assigned to each user based on the determined radio frequency conditions.

8. The base transceiver station of claim 7, wherein users with worse radio frequency conditions are assigned more transmit power than users with better radio frequency conditions.

9. The base transceiver station of claim 6, wherein the same time slot is transmitted in a 1× evolution data only (1×EV-DO) frame.

10. The base transceiver station of claim 6, wherein users with worse radio frequency conditions are assigned more Walsh codes than users with better radio frequency conditions.

11. A wireless communication device, comprising:
   a transmitter which transmits information to a number of users in a single time slot; and
   a processor including:
      logic which determines radio frequency conditions for each of the number of users;

logic which assigns a number of Walsh codes to each of the number of users, based on the determined radio frequency conditions; and logic which transmits information to the number of users in a same time slot using the number of Walsh codes assigned to each user.

12. The wireless communication device of claim 11, wherein an amount of transmit power is assigned to each user based on the determined radio frequency conditions.

13. The wireless communication device of claim 12, wherein users with worse radio frequency conditions are assigned more transmit power than users with better radio frequency conditions.

14. The wireless communication device of claim 11, wherein the same time slot is transmitted in a 1× evolution data only (1×EV-DO) frame.

15. The wireless communication device of claim 11, wherein users with worse radio frequency conditions are assigned more transmit power than users with better radio frequency conditions.

16. A computer-readable medium encoded with a computer program for transmitting information from a base transceiver station, the computer program comprising instructions for:

determining radio frequency conditions for a number of users;

assigning a number of Walsh codes to each of the number of users based on the determined radio frequency conditions; and transmitting information to the number of users in a same time slot using the number of Walsh codes assigned to each user.

17. The computer-readable medium of claim 16, wherein an amount of transmit power is assigned to each user based on the determined radio frequency conditions.

18. The computer-readable medium of claim 17, wherein users with worse radio frequency conditions are assigned more transmit power than users with better radio frequency conditions.

19. The computer-readable medium of claim 16, wherein the same time slot is transmitted in a 1× evolution data only (1×EV-DO) frame.

20. The computer-readable medium of claim 16, wherein users with worse radio frequency conditions are assigned more Walsh codes than users with better radio frequency conditions.

* * * * *

UNITED STATES PATENT AND TRADEMARK OFFICE
CERTIFICATE OF CORRECTION

PATENT NO.      : 7,643,406 B2
APPLICATION NO. : 11/200186
DATED           : January 5, 2010
INVENTOR(S)     : Nagi A. Mansour It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 759 days.

Signed and Sealed this

Sixteenth Day of November, 2010

David J. Kappos
*Director of the United States Patent and Trademark Office*